W. DE F. CROWELL.
CLEAR VISION WIND SHIELD FOR VEHICLES.
APPLICATION FILED MAR. 22, 1918.
1,334,740.
Patented Mar. 23, 1920.
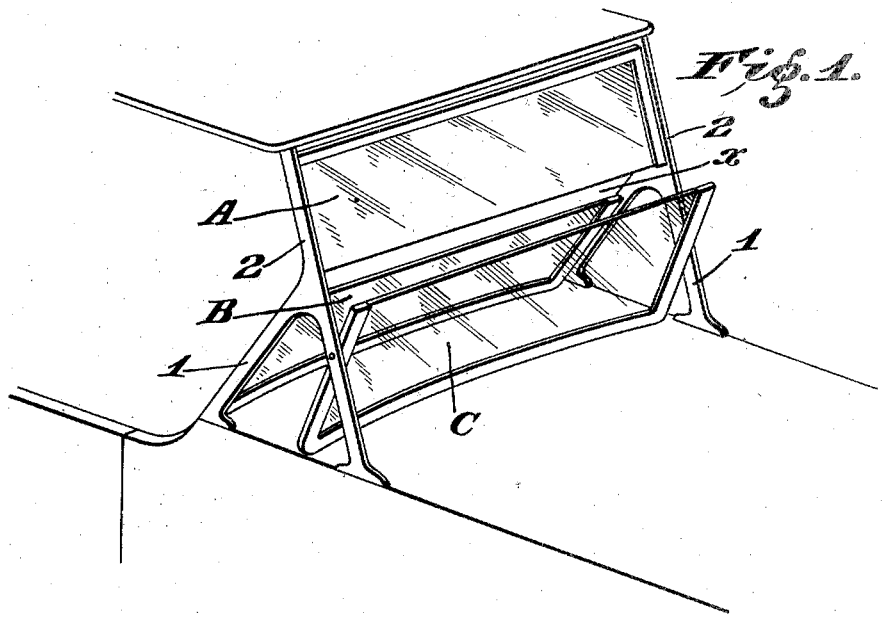
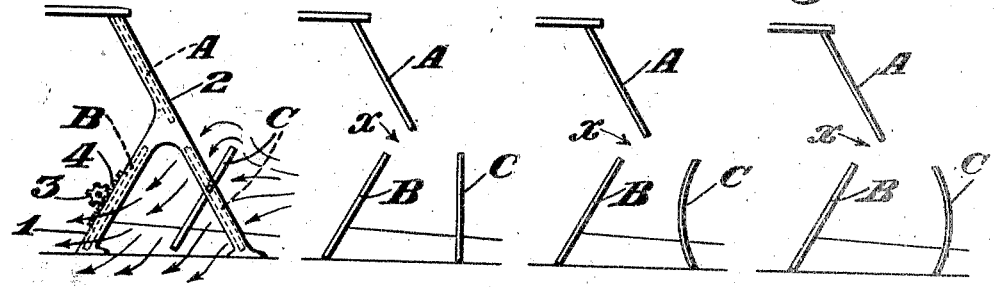
Inventor:
William de F. Crowell,
By Bakewell & Church
his Attys.

UNITED STATES PATENT OFFICE.

WILLIAM DE F. CROWELL, OF ST. LOUIS, MISSOURI.

CLEAR-VISION WIND-SHIELD FOR VEHICLES.

1,334,740. Specification of Letters Patent. Patented Mar. 23, 1920.

Application filed March 22, 1918. Serial No. 223,959.

*To all whom it may concern:*

Be it known that I, WILLIAM DE F. CROWELL, a citizen of the United States, residing at St. Louis, Missouri, have invented a certain new and useful Improvement in Clear-Vision Wind-Shields for Vehicles, of which the following is a full, clear, and exact description, such as will enable others skilled in the art to which it appertains to make and use the same.

This invention relates to wind shields for automobiles and other conveyances, and particularly to wind shields of the type that are provided with a horizontally-disposed slot, gap or open space that affords a clear vision for the driver in inclement weather.

The main object of my invention is to provide a practicable clear vision wind shield of simple design that affords an unobstructed view for the driver in inclement weather and also complete protection from air currents, dust, rain and the like that beats against the front side of the shield when the vehicle is traveling forwardly.

To this end I have devised a wind shield having a lower part comprising two transversely-disposed members that form the front and rear sides of an open-ended trough, and an upper part formed by a member that extends downwardly from the top of the vehicle and terminates at a point intermediate the front and rear sides of said trough and far enough above the upper edge of same to form a clear vision slot that affords an unobstructed view for the driver or operator in inclement weather, the lower part of the shield being so constructed that a current of air cannot flow rearwardly under the lower edge of same. When the vehicle is traveling forwardly the air that rushes past the openings at the outer ends of the trough or space between the transversely-disposed lower members of the shield creates a suction that sucks out of said trough any air, rain, dust or the like that has entered same. The result is that a downward current of air will be created in proximity to the slot between the top member of the shield and the rear side of the trough of sufficient intensity to prevent wind, dust, rain and the like from blowing inwardly into the vehicle under the lower edge of the top member of the shield. I am aware of the fact that so-called clear vision wind shields have heretofore been devised in which a baffle was arranged at the front side of the lower portion of the shield for the purpose of directing a current upwardly across the clear vision slot of the shield, but one very objectionable characteristic of such shields is that they depend upon an upwardly-flowing current of air to counteract the force of gravity and lift rain, snow and the like and carry it upwardly across the clear vision slot. My improved wind shield is distinguished from prior wind shields of the type just referred to in that a downwardly-flowing current of air is used in conjunction with the force of gravity to carry rain, snow, dust and the like downwardly into a trough arranged below and spaced away from the lower edge of the top member of the shield, which is provided at its ends with openings so as to insure a constant circulation of air downwardly and laterally through said trough, thereby eliminating the possibility of air, dust, rain and the like from blowing inwardly into the passenger compartment of the vehicle through the clear vision slot in the shield.

Figure 1 of the drawings is a perspective view, illustrating one form of my invention.

Fig. 2 is a side elevational view of the wind shield shown in Fig. 1; and

Figs. 3, 4 and 5 are vertical sectional views, illustrating various modifications of the wind shield shown in Figs. 1 and 2.

In the accompanying drawings which illustrate various forms of my invention, A designates the top portion of the shield formed by a member or part that projects downwardly from the top of the vehicle on which the shield is used, and B and C designate members that are mounted on the cowl of the body of the vehicle in such a manner that they form the rear and front sides, respectively, of a trough which extends transversely of the vehicle, said members B and C being so arranged on the cowl that a current of air cannot flow under the lower edges of said members. In the form of my invention herein illustrated the cowl of the body forms the bottom of the trough between the members B and C, but I wish it to be understood that it is immaterial, so far as my broad idea is concerned, whether the bottom of the trough is formed by a part that constitutes a portion of the wind shield *per se*, or by a part of the vehicle on which the wind shield is used. The lower edge of the top member A of the shield terminates at a point intermediate the members C and B that form the front and rear sides of the trough in the lower part of the shield and far enough above the upper edges of said members to form a clear vision slot $x$ that affords a clear vision for the driver of the vehicle in inclement weather. Said members A, B and C are preferably, but not necessarily, formed of glass or other suitable transparent material and they are mounted in a suitable supporting structure either rigidly or in such a manner that they can be adjusted in various positions. When the wind shield is designed for use on an automobile it is preferable to mount the members A, B and C on side standards that are secured to the cowl of the body of the vehicle. In the various forms of my invention herein illustrated the top member A of the shield is arranged in an inclined position with its upper edge sloping rearwardly, but I wish it to be understood that my broad idea is not limited to a wind shield whose top member is arranged in the manner herein illustrated. The members B and C that form the rear and front sides of the trough can be arranged in various positions, so long as the upper edges of said members terminate at the rear and in front, respectively, of the lower edge of the top member A and far enough below the lower edge of said top member to form a clear vision slot. In the form of my invention shown in Figs. 1 and 2 the member B is inclined oppositely to the top member A of the shield, and the member C is so mounted that it can be arranged either in a position substantially parallel with the member B, as shown in full lines in Figs. 1 and 2, or in an oppositely-inclined position so that it lies in substantially the same inclined plane in which the top member A of the shield lies. The side standards that carry the members A, B and C are herein illustrated as provided with a substantially inverted V-shaped lower portion 1 and a top member 2 that forms a continuation of the front leg of the lower portion of the standard, the top member A of the shield being mounted on the top portion 2 of said side standards, the bottom rear member B of the trough being mounted on the rear legs of the bottom portions 1 of said side standards and the bottom front member C of the trough being mounted on the front legs of the bottom portions of said side standards. The member C can either be flat, as shown in Figs. 1 and 2, concaved in vertical cross section, as shown in Fig. 4, or convexed in vertical cross section, as shown in Fig. 5, and said member C can either be disposed vertically, as shown in Fig. 3, when arranged in its operative position, or in a forwardly-inclined position, as shown in Fig. 2. In all forms of my invention it is essential that the front member C of the trough be so arranged that the upper edge of same terminates below and in advance of the lower edge of the top member A of the shield, that the rear member B of the trough be so arranged that the upper edge of same terminates below and at the rear of the lower edge of the top member of the shield and also that the trough between the members B and C be provided at its opposite ends with openings so as to induce a circulation of air downwardly and laterally through the open ends of said trough when the vehicle is traveling forwardly. Furthermore, in order to obtain the best results, it is essential that the front member or side of the trough be so shaped or mounted that a current of air cannot rush under the lower edge of same into the trough or passageway at the rear side of said member.

Assuming that the front member C of the trough is arranged in the position shown in full lines in Figs. 1 and 2 and that the vehicle is traveling forwardly, the air that rushes past the ends of said member C will create a suction in the trough or passageway at the rear side of said member, thereby causing a current of air to circulate downwardly in proximity to the slot between the top member of the shield and the rear side B of the trough, as indicated by the arrows in Fig. 2, and thus prevent wind, dust, rain and the like from blowing inwardly through said slot. Most of the air that strikes the front side of the member C escapes laterally from the ends of said member, but some of the air that strikes the member C is drawn upwardly and downwardly over the upper edge of same by the suction or partial vacuum in the trough between the members B and C, the air that enters said trough flowing downwardly and laterally through same and escaping through the openings at the ends of said trough. While I have stated that the front member C of the trough is so mounted that no air passes under the lower edge of same, I do not wish it to be understood that a slight amount of air passing under the lower edge of said member would prevent the wind shield from functioning in the manner previously described. The best results are obtained, however, when the member C is so arranged that no air passes under the lower edge of same, and accordingly, I prefer to construct the shield in this manner.

It is not essential to the successful operation of my invention that the front side C of the trough be inclined forwardly, still it is preferable to arrange said member C in this manner so as to reduce the tendency of the air to bank in front of the lower portion of the shield, the angular position of the members B and C tending to cause the air which strikes same to flow downwardly away from the upper edges of said members. The current of air that circulates through the trough not only prevents wind, dust, rain and the like from blowing inwardly into the passenger compartment of the vehicle, but it also tends to carry away any water that drips from the lower edge of the top member A of the shield. In fact, under ordinary operating conditions the current of air that circulates through the trough tends to induce a circulation of air outwardly through the slot or space between the top member A of the shield and the rear member B of the trough, thus ventilating the passenger compartment, and consequently, making the shield extremely desirable for use on a closed automobile body.

The lower edge of the top member of the shield is positioned far enough in advance of the upper edge of the rear member B of the trough to prevent rain, snow or sleet from driving inwardly through the slot between said members during an ordinary storm, and the front member C of the trough is so positioned with relation to the members A and B that it prevents rain or sleet that strikes the hood of the automobile and bounds upwardly from entering the slot between the members A and B.

In fair weather, or whenever it is not desired to use the clear vision slot, the front member C of the trough can be arranged in the position shown in broken lines in Fig. 2, in which position the member C alines with and forms a continuation of the top member A of the shield. I prefer to mount the rear member B of the trough in such a manner that it can be moved upwardly so as to close the slot or space between the upper edge of said member and the top member A of the shield, thus forming a tight closure for the front of the passenger compartment of the vehicle. It is immaterial what means is employed for adjusting or moving the member B upwardly, but one means that I have found to be very efficient for this purpose consists of manually-adjustable pinions 3 on the side standards that coöperate with rack bars 4 on the member B. When the wind shield is used on an automobile body of the closed type the upper portions of the side walls of the body will terminate at the upper portions 2 of the side standards and at the rear legs of the lower portions 1 of said side standards, thus leaving the ends of the trough open so as to permit air to circulate through said trough in the manner previously described.

When the wind shield is used on an automobile body of the touring type the side curtains of the automobile will be so constructed that they terminate at the portions of the side standards just referred to.

Having thus described my invention, what I claim and desire to secure by Letters Patent, is:

1. A wind shield provided with a transversely-disposed top member that forms the upper portion of the shield, and a lower part comprising members that form the front and rear sides of a transversely-disposed trough provided at its ends with openings, said trough members being so arranged that the upper edges of the front and rear sides of the trough terminate at a point in advance of and at the rear of the lower edge of said top member and far enough below same to form a clear vision slot.

2. A wind shield for vehicles, comprising bottom members that form the front and rear sides of a transversely-disposed trough through which air circulates downwardly and laterally when the vehicle is traveling forwardly, and a top member whose lower edge terminates above said trough at a point intermediate the members that form the front and rear sides of said trough.

3. A wind shield, comprising a rearwardly-inclined top member, and two transversely-disposed bottom members that form the front and rear sides of an open-ended trough, the lower edge of said top member terminating above said trough and far enough to the rear of the member that forms the front side of said trough to permit air to flow downwardly into said trough and escape laterally through the openings at the ends of the trough.

4. A wind shield, comprising a rearwardly-inclined top member, and bottom members that form the front and rear sides of an open-ended trough whose upper edge is spaced far enough away from the lower edge of said top member to form a relatively narrow clear vision slot or gap, the bottom member that forms the front side of said trough being arranged in advance of the lower edge of the top member of the shield and the bottom member that forms the rear side of said trough being inclined forwardly.

5. A wind shield composed of a top portion and a bottom portion spaced apart so as to form a relatively narrow clear vision slot or gap, said bottom portion comprising transversely-disposed members that form the front and rear sides of an open-ended trough whose front side slopes forwardly and terminates at a point in advance of the lower edge of the top portion of the shield.

6. A wind shield for automobiles, comprising side supports, a top member mounted on said side supports, and two bottom members mounted on said side supports and adapted to coöperate with the cowl of the body of the automobile to form an open-ended trough that extends transversely of said body, the rear bottom member being so arranged that the upper edge of same terminates below and at the rear of the lower edge of said top member and the front bottom member being so arranged that its upper edge terminates below and in advance of the lower edge of said top member.

WILLIAM DE F. CROWELL.